3,175,947
HUMAN SERUM TETANUS ANTITOXIN
TITER PRODUCTION
Sidney Goldsmith, 929 Tyson Ave., Philadelphia, Pa.
No Drawing. Filed July 31, 1961, Ser. No. 127,836
2 Claims. (Cl. 167—78)

The present invention is concerned with a new, useful and extremely valuable antitoxin serum and to a method for the preparation thereof. More particularly, this invention relates to a human tetanus antitoxin serum and to a process for its preparation.

Up to the present time, antitoxin sera derived from different animal species such as horses, sheep and oxen, were employed in the prophylactic treatment of tetanus. It was also known that antibiotics and particularly, penicillins, exerted a bacteriostatic action on the tetanus bacillus (*Clostridium tetani*) thereby suppressing or diminishing the elaboration of the toxin by the bacillus. However, despite this beneficial action, antibiotics do not exert any direct neutralizing action on the toxin itself. Furthermore, the antibiotics which were administered orally or parenterally may not always arrive in the area harboring the bacilli due to the possible deficient vascularization at that point. Another disadvantage associated with the use of antibiotics is that these substances are not bacteriocidal with respect to the tetanus bacillus since the microorganism is able to pullulate and produce toxin when the level of the antibiotic is diminished in the blood circulation.

The antitetanic sera that are presently in use are generally obtained by hyperimmunization of an animal (generally, a horse) by injecting the animal with increasing doses of alum-toxoid or by injection initially of the anatoxin followed by injection of the tetanus toxin per se. The antitoxin sera neutralize the neurotropic toxin elaborated in the individual by the microorganism i.e., *C. tetani*, insofar as this toxin has not as yet been localized in the nerve cell in which case, the antitoxin serum produces no effect.

It is well known that there are marked disadvantages in the use of antitoxin sera of equine or bovine or ovine) origin as such sera provide only a very short period of protection for the individual. Thus, the protection conferred, in humans, by a prophylactic dose of 1500 I.U. of horse antitoxin serum is of only six days duration and the effect is only after six hours or even longer after administration. In addition and this is also of great significance, severe reactions such as serum sickness and anaphylactic (allergic) shock, follow the introduction of such sera into human tissues and these effects are attributable to the foreign non-specific proteins in the sera.

Thus, it has been found that a significant proportion, i.e., probably more than 50%, of individuals will develop serum sickness on administration of animal serum if they have never before received such serum or did not previously become sensitive to the proteins present in the serum. Serum sickness is an allergic systemic reaction which follows an injection of the heterologous serum and is the result of interaction between a specific antibody and an antigenic protein or proteins contained in the injected foreign serum. This condition is characterized by an incubation period, skin eruptions, enlargement of lymph nodes, fever, edema, polyarthritis, neuropathies, deafness, blindness, paralysis and other complications.

Another serious reaction that is, anaphylactic or allergic shock, is brought on in individuals who are allergic to protein antigens in the serum on injection of a foreign serum. Almost before the needle is withdrawn, local pruritis may commence and is rapidly followed by generalized urticaria, sneezing, coughing, asthma and apprehension. Other developments are pallor or cyanosis and a rapid weak pulse. The blood pressure drops considerably and the patient may become unconscious at the onset or after a few minutes or hours. Convulsions and death may supervene within a short space of time.

To minimize such allergic manifestations as serum sickness and anaphylactic shock, attempts have been made to eliminate the foreign proteins from the serum by purification using physicochemical and enzymatic procedures. Thus, using physicochemical methods, the useless immunological inert proteins such as euglobulins and albumins have been eliminated. Alternatively, employing an enzyme such as pepsin, trypsin or papain, the pseudoglobulins have been hydrolyzed up to the tolerance limit of the antitoxins attached to them so as to obtain a final product referred to as a proteolysed serum. However, by employing the aforesaid purification procedures, it has been found that the purified products do not either reduce or eliminate the aforementioned reactions. A second and obvious disadvantage is that the additional purification procedures add greatly to the cost of the final product. Other procedures have been used to reduce allergic effects on administration of sera and these procedures are also not recommended because they are not only too laborious or complicated but in addition do not produce the desired results.

It has now been found that a human tetanus antitoxin serum can be obtained which is far superior to antitoxin serum derived from animal species. As the human antitoxin serum is a homologous serum, the possibility of serum sickness or anaphylactic shock is removed. Thus, the use of human antitoxin serum for the prophylaxis of tetanus would avoid the undesirable side reactions and effects accompanying sera hitherto used and at the same time, a high titer of serum would be obtained. In addition to the foregoing advantages, by the use of the human tetanus antitoxin serum of higher titer of the present invention, the desired therapeutic effect is obtained within a very short period of time that is, within about 2 hours and in addition, a period of efficacy of up to 9 days or even longer is obtained.

In the preparation of the human antitoxin serum of the present invention, approximately 115 white male individuals were employed ranging in age from 19 to 35. It should be mentioned that individuals of either sex, in good health and preferably 18 years or older should be used in the production of the serum. Sixty-five of these individuals were used as controls while the other fifty were subjected to immunization. The 65 controls were vaccinated previously against tetanus by 3 injections of tetanus anatoxin soley, 1 cc., 2 cc. and 2 cc., respectively, in intervals of three weeks. After about 2½ months, blood was withdrawn from each of these 65 controls and the bloood was then titrated for its antitoxin potency. The other fifty individuals, 65% of whom were previously vaccinated against tetanus (Te 3× i.e., received three basic injections of the toxoid), and 35% of whom were never vaccinated before against tetanus, were then subjected to a combined tetanus toxoid-pertussis vaccine (Te-Pert). For each injection, 0.2 cc. tetanus toxoid associated with 0.5 cc. of pertussis vaccine was used. Injections of this combined immunization were given at intervals of usually 8 days and the booster injection of this combined immunization, wherever given, was given at an interval from 3–6 months after the preceding injection. The booster injection was of the same quantity as the basic vaccination of tetanus-pertussis toxoid except in two cases where 2.00 cc. of tetanus anatoxin (toxoid) was given for the booster injection of the 50 individuals some receiving 1, others 2 and still others 3 injections of tetanus pertussis vaccine. Thirtyfive percent of these individuals received a booster injection of the tetanus pertussis vaccine while 65% did not.

Eight days after the individual had received the last injection of the tetanus-pertussis vaccine, either the basic vaccination of tetanus-pertussis toxoid or a booster injection of tetanus-pertussis toxoid, whichever the case, the patient was bled. The different sera were titrated for antitoxin potency and if the serum had an antitoxin potency of 15 I.U. or more then it was ready for concentration and purification.

One unit of antitoxin (one Rosenau American unit or one International unit 1950—1 I.U.) is defined as "ten times the least amount of serum necessary to save the life of a 350 gram guinea pig for 96 hours againt the official tetanus dose of the standard toxin (against which one tenth of a unit of the control antitoxin protects similarly).

Concentration and purification of the serum was effected by conventional procedures as, for example, by ammonium sulphate fractionation. This method of concentration and purification is based on the fact that the antitoxin is associated chiefly with the pseudoglobulin fraction of the protein. Euglobulin and fibrinogin of the plasma are precipitated by adding saturated ammonium sulphate solution to the plasma to a concentration of 29% and heating to 60° C. thereby increasing the precipitation of the non-specific proteins. The precipitate is then removed by filtration and the pseudoglobulin with its associated antitoxin is precipitated leaving the albumin in solution by increasing the content of saturated ammonium sulphate solution in the filtrate to 48%. Excess moisture and some ammonium sulphate are removed from the precipitate by pressure and the remaining ammonium salt by dialysis. Further purification is accomplished by iso-electric precipitation of the residual euglobulin after which the pseudoglobulin is precipitated with ammonium sulphate. This precipitate is pressed and the ammonium salts removed by dialysis. Sodium chloride, to give a concentration of 0.8% and a preservative such as phenol or cresol are added to the dialyzed material and the hydrogen ion concentration is adjusted to that of the blood.

By the foregoing or other procedures, the serum is concentrated to at least 150 I.U./cc. and the concentrated serum is then filtered to remove any microorganisms present. After filtration, the antitoxin is standardized by determining its neutralizing action against a standard tetanus toxin in guinea pigs in comparison with the neutralizing action of a standard control antitoxin. The potency of the antitoxin is expressed in units per milliliter. The test dose consists of 100 minimal lethal doses (M.L.D.) of a precipitated toxin preserved under special conditions at the hygienic laboratory of the National Institute of Health. One M.L.D. is the smallest amount of toxin that, when injected subcutaneously, will kill a guinea pig weighing between 330 and 380 grams in 96 hours.

The unit of antitoxin just described is twice that of the international unit (U.A.) as defined by the Health Organization of the League of Nations in 1929. However, since 1950, at the suggestion of the World Health Organization, there was adopted by all countries of the world, an international unit (I.U.). This I.U. is equivalent to the Rosenau American unit and is equal to two of the former antitoxic units (U.A.) adopted in 1929 by the Health Organization League of Nations. The human antitoxin serum, in its final product, has an antitoxic potency of at least 150 I.U. per cc. and for prophylactic purposes at the most, 10 cc. of this serum should be utilized to obtain a prophylactic dosage of 1500 I.U.

In the immunization of the individuals, only 0.2 cc. of tetanus toxoid was used in combination with the pertussis vaccine. Combined immunization or the administration of two or more prepartions in a single injection is based on the principal that certain substances increase the immunizing effect of toxoids. Thus, by combining two or more antigens as dissimilar as a toxoid and a bacterial or viral vaccine or two or more toxoids of such different specificity as for example, diphtheria toxoid and tetanus toxoid, each antigen is reinforced and simultaneously produces immunity.

The results are set out in the following table:

| Previous Tetanus Vaccination | No. of subjects used | Vaccination Basic Te-Pert, cc. | Booster injection with Te-Pert, cc. | Interval since previous vaccination | Titer in I.U. after— | | |
|---|---|---|---|---|---|---|---|
| | | | | | 8 days | 10 days | 2½ months |
| TE 3X | 65 | 0 | 0 | 2½ months | | | 65=<15 |
| TE 3X | 3 | 1X0.7 | 0 | 15 years | 1=>15 | | |
| | | | | 15 years | 1=37.5 | | |
| | | | | 5 years | 1=<15 | | |
| TE 3X | 5 | 2X0.7 | 0 | 15 years | 1=>15 | | |
| | | | | 3 years | 1=20 | | |
| | | | | 3 years | 3=<15 | | |
| 0 | 2 | 2X0.7 | 0 | | 2=<15 | | |
| TE 3X | 12 | 3X0.7 | 0 | 6 years | 1=>15 | | |
| | | | | 10½ years | 2=15 | | |
| | | | | 15 years | 1=30 | | |
| | | | | 3 years | 8=<15 | | |
| 0 | 11 | 3X0.7 | 0 | | 1=15 | | |
| | | | | | 10=<15 | | |
| TE 3X | 1 | 1X0.7 | 1X0.7 | 6 years | <15 | | |
| TE 3X | 4 | 2X0.7 | 1X0.7 | 2 years | 4=<15 | | |
| 0 | 1 | 2X0.7 | 1X0.7 | | <15 | | |
| Te 3X | 6 | 3X0.7 | 1X0.7 | 6 months | 1=>15 | | |
| | | | | 3 years | 5=<15 | | |
| 0 | 3 | 3X0.7 | 1X0.7 | | 1=15 | | |
| | | | | | 2=<15 | | |
| Te 3X | 1 | 2X0.7 | 1X2.0 | 3 years | 20 | 20 | |
| Te 3X | 1 | 3X0.7 | 1X2.0 | 10 years | 20 | <15 | |

Of the 65 individuals (controls) who were vaccinated against tetanus 2½ months previously, with *tetanus anatoxin solely,* not one of these individuals obtained a serum titer of antitoxin greater than 15 I.U. per cc.

Of the fifty persons subjected to the combined immunization Te-Pert (tetanus-pertussis) in varying degrees, 33 of these individuals had received a previous basic vaccination (Te 3×, i.e., 3 injections of tetanus toxoid), while the remaining 17 persons never received a tetanus vaccination prior to vaccination with the combined immunizaiton Te-Pert. For the individuals who had received a basic vaccination, the combined immunization Te-Pert would act as a booster injection. This offers some explanation as to the reason for attaining a serum titer of 15 I.U. per cc. or more, in previously vaccinated individuals, after receiving 1 or 2 or 3 injections of the combined immunization Te-Pert. Thirteen of these 50 individuals produced a serum antitoxin titer of 15 I.U. per cc. or greater. Eleven of these 13 subjects had a previous basic vaccination (Te 3×) while 2 did not prior to vaccination with Te-Pert.

It can therefore be concluded that in order to obtain high serum antitoxin titers, the subject should be well immunized previously. The two individuals who were never previously vaccinated but who attained a titer of 15 I.U. per cc. either received three basic injections of the combined immunization Te-Pert, with or without a booster injection of Te-Pert but not less than 3 injections basically.

Of the 11 individuals who received a previous basic injection and attained a titer of 15 I.U. per cc. or more, 73% had an interval of more than 5 years between previous basic vaccination (Te 3×) and the basic vaccination Te-Pert (a booster injection for these individuals). Of the 22 individuals receiving a previous basic injection (Te 3×) but did not attain a serum titer of 15 I.U. per cc., 95% had an interval between their previous basic vaccination and of the vaccination Te-Pert of 5 years or less. Thus, to obtain serum titers of antitoxin of 15 I.U. per cc. or more, not only is previous immunization including a booster injection containing a tetanus toxoid in combination with another toxoid and/or a bacterial or viral vaccine necessary, but also there should be an interval of time between the basic injection and the booster injection, preferably in the order of 5 years or more. The two individuals who attained the highest serum antitoxin titers that is, 37.5 and 30 I.U. per cc., respectively, had an interval of 15 years between their previous basic vaccination (Te 3×) and the combined toxoid-vaccine Te-Pert.

Thus, an individual employed for the production of high titered human tetanus antitoxin serum must have had a previous basic tetanus vaccination consisting of at least two or three injections of tetanus toxoid at appropriate intervals. The basic tetanus vaccination could have consisted of either tetanus toxoid solely (aluminum phosphate adsorbed or fluid toxoid) or be of a polyvalent immunization, i.e., not only containing tetanus toxoid but also diphtheria toxoid and/or pertussis vaccine, for example. In addition, the selected individual must receive a tetanus booster injection after the basic tetanus vaccination. Such a booster must be of the polyvalent type, i.e., must not only contain a combined toxoid of tetanus and diphtheria but must also contain a bacterial vaccine such as the pertussis vaccine or for example, a viral vaccine. In addition, it has been found that the time interval between the basic tetanus vaccination and the polyvalent tetanus booster injection should preferably be more than 5 years and more preferably longer than 10 years. The individual employed should not have received a tetanus booster injection during the interval between the original basic tetanus vaccination and the polyvalent tetanus booster injection.

Approximately between 10 and 20 days and preferably more than 15 days following the polyvalent tetanus booster injection, the individual is phlebotomized (bled) for 500–600 cc. of whole blood. The human serum containing the potent tetanus antitoxin, at least 15 units per cc., is then removed from the whole blood either by centrifugation or by allowing the erythrocytes (red blood cells) to settle out and then removing the supernatant serum. The tetanus antitoxin is formed in the pseudoglobulin of the gammaglobulin fraction of human serum and the serum can then be purified and concentrated by conventional procedures as for example by an alcohol fractionation procedure (Cohn's method or a modification thereof), or by ammonium sulphate fractionation and preferably by an alcohol fractionation procedure as this method destroys and eliminates the serum hepatitis virus should it exist in the serum of the individual employed. The potent human tetanus antitoxin serum can then be concentrated so as to contain at least 1500 units per one-two cc. The serum in liquid form can then be placed in a suitable container or lyophilized and then stored. In its lyophilized form, prior to use, the powder can be diluted either with normal saline or other diluent which is not injurious to the tetanus antitoxin antibody activity.

It has been found that for the prophylactic treatment of tetanus, about 1500 units of human tetanus antitoxin serum should be used and this material can be administered intramuscularly. For the therapeutic treatment of tetanus, 10,000 units of human tetanus antitoxin serum or more is recommended and this material can be administered intramuscularly or intravenously.

It is understood that the foregoing detailed description is given merely by way of illustration and that many variations may be made therein without departing from the spirit of my invention.

Having described my invention, what I desire to secure by Letters Patent is:

1. In the method of obtaining human tetanus antitoxin serum having an antitoxic potency of at least 150 I.U. per cc. by the combined sequence of steps consisting of:
   (a) immunizing with a combination product containing tetanus toxoid and pertussis vaccine, donors who have been previously immunized against tetanus and who are in good health and are capable of being bled for 500–600 cc. of whole blood;
   (b) bleeding said donors within an 8 to 20 day period following the last scheduled injection of said tetanus-pertussis combination immunization product;
   (c) titrating the individual sera for antitoxin potency;
   (d) selecting for concentration and purification sera having an antitoxin potency of at least 15 international units (I.U.) per cc.;
   (e) concentrating said sera (having an antitoxin potency of at least 15 I.U./cc.) to at least 150 I.U./cc.
   (f) adding 0.8% sodium chloride to a sterile filtrate of concentrated sera;
   (g) adding a preservative selected from the group consisting of phenol and cresol;
   (h) adjusting the hydrogen ion concentration to that of blood;
   (i) standardizing the human antitoxin sera, in its final product, to have an antitoxic potency of at least 150 I.U./cc.;

the improvement which consists essentially of producing human serum tetanus antitoxin titers of at least 15 I.U./cc. by immunizing with a 0.2 cc. tetanus toxoid/0.5 cc. pertussis vaccine combination immunization product, donors who have been well immunized against tetanus at least 5 years previously and who have not received a tetanus booster injection during the aforesaid interval of at least five years.

2. A method according to claim 1 wherein the time interval in which donors have not received a tetanus booster injection is between 10 and 15 years.

References Cited by the Examiner
UNITED STATES PATENTS

| | | | |
|---|---|---|---|
| 2,437,060 | 3/48 | Williams et al. | 260—112 |
| 2,520,076 | 8/50 | Williams et al. | 260—112 |
| 2,543,215 | 2/51 | Williams et al. | 260—112 |
| 2,793,203 | 5/57 | Schultze et al. | 260—112 |

OTHER REFERENCES

Barr et al.: "Some Factors Influencing the Response of Animals to Immunisation with Combined Propylactics," Brit. J. Expt'l Path. 34: 12–22 (1953).

Batson: January 1958, vol. 21, No. 1, pages 1–6.

Conn: Current Therapy, 1961, pages 58–60, 66 and 67 pub. by W. B. Saunders Feb. 10, 1961, Phila., Pa.

Fein: Modern Drug Encyclopedia and Therapeutic Index, 8th Edition, pages 595–596, Jan. 25, 1961, pub. by the Reuben H. Donnelly Co., N.Y.C.

Gross et al.: "Therapeutic Uses of Gamma Globulins," New England Journal of Medicine 260(4): 170–178, Jan. 22, 1959.

JAMA, Dec. 25, 1948, pages 1286.

(Other references on following page)

OTHER REFERENCES

Levine et al.: Excerpta Medica, sec. IV, vol. 7, November 1954, p. 1256, paragraph 6469.

Levine et al.: "Field study in triple immunization (diptheria, pertussis, tetanus): estimation of Three Antibodies in Infant Sera from Single Heel Puncture Using Agglutination Techniques," J. Pediatrics 57(6): 836–843, December 1960.

Looney et al.: New England J. of Med., vol. 254, No. 1, pp. 6–12, Jan. 5, 1956.

McComb et al.: "Passive-Active Immunization With Tetanus Immune Globulin (Human)," New England J. Med. 268(16): 857–862, Apr. 18, 1963.

McComb: "The Prophylactic Dose of Homologous Tetanus Antitoxin," New England J. Med. 270(1): 175–178, Jan. 23, 1964.

Rubbo et al.: "Passive Immunization Against Tetanus With Human Immune Globulin," Brit. Med. 1962, II, pp. 79–81, July 14, 1962.

Smolens et al.: "Human Plasmapheresis and Its Effects on Antibodies," J. Immunology 79,: 434–439 (1957).

Smolens et al.: "The Persistence in the Human Circulation of Horse and Human Tetanus Antitoxins," J. Pediatrics 59, pp. 899–902, December 1961.

Suri et al.: "Immunization Against Tetanus," J. Hyg. 59, pp. 29–48, March 1961.

Turner et al.: "Studies on the Duration of Protection Afforded by Active Immunization Against Tetanus," Johns Hopkins Hosp. Bull. 94: 204–217 (1954).

LEWIS GOTTS, *Primary Examiner.*

MORRIS O. WOLK, *Examiner.*